United States Patent [19]

Giannini et al.

[11] Patent Number: 5,005,390
[45] Date of Patent: Apr. 9, 1991

[54] LOCK FOR QUICK RELEASE MECHANISM ON BICYCLE WHEELS, SEATS AND CAR RACKS

[76] Inventors: George R. Giannini, 6419 Longridge Ct., Foresthill, Calif. 95631; George G. Giannini, 500 Mansion Ct., Apt. No. 203, Santa Clara, Calif. 95054

[21] Appl. No.: 516,572

[22] Filed: Apr. 30, 1990

[51] Int. Cl.⁵ ............................................. B60R 25/00
[52] U.S. Cl. ...................................... 70/225; 70/202; 70/233
[58] Field of Search ................ 70/225, 233, 229, 230, 70/231, 232, 209, 210, 211, 201, 202

[56] References Cited

U.S. PATENT DOCUMENTS

| | | | |
|---|---|---|---|
| 4,028,915 | 6/1977 | Stahl | 70/233 |
| 4,621,873 | 11/1986 | Weinstein | 70/233 |
| 4,724,692 | 2/1988 | Turin | 70/225 |
| 4,770,011 | 9/1988 | Constant | 70/225 |

Primary Examiner—Robert L. Wolfe
Attorney, Agent, or Firm—Lothrop & West

[57] ABSTRACT

For use with a quick release mechanism of the quick release lever type for selectively securing and releasing the front wheel of a bicycle relative to the front fork thereof, or the seat post relative to the seat post socket, or the front fork to a vehicle bicycle rack, a lock device including a pivoted blade and controlled by lock engaging means, such as a key, enables or disables the operation of the lever and thus the quick release mechanism by moving the blade between a first position in non-interfering relation with the movement of the quick release lever and a second position in interfering relation therewith.

6 Claims, 3 Drawing Sheets

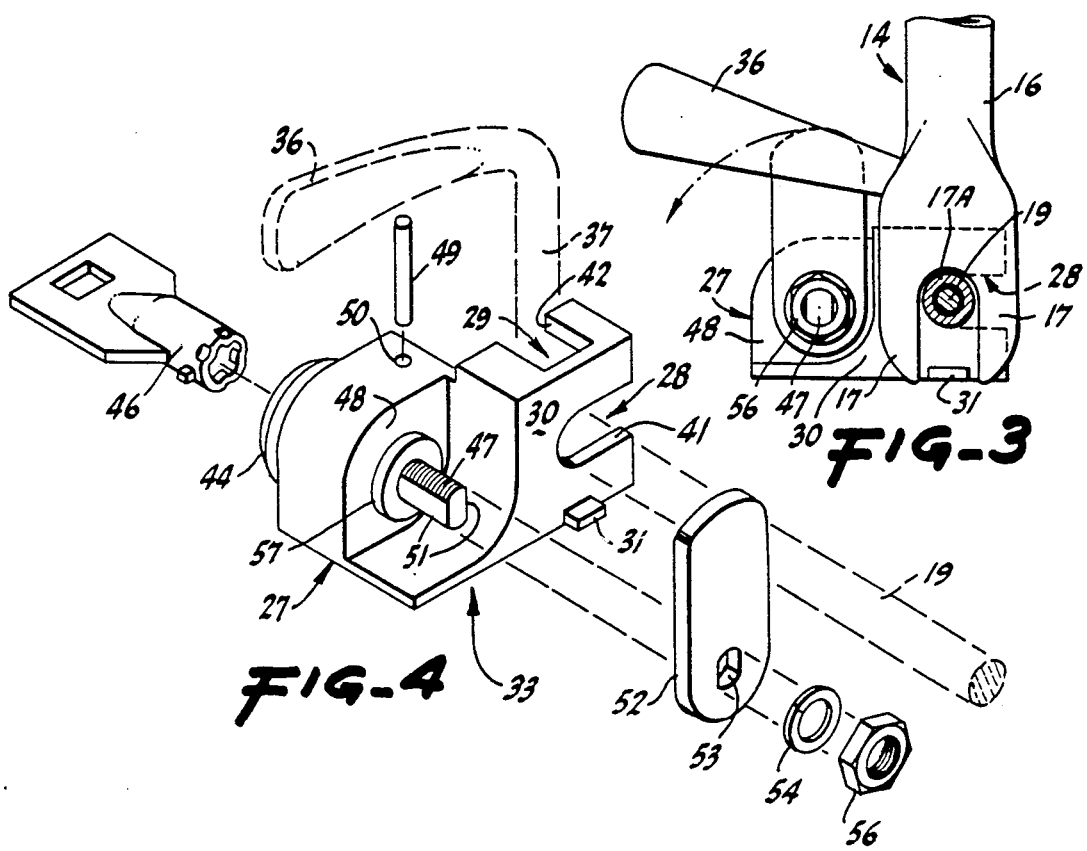
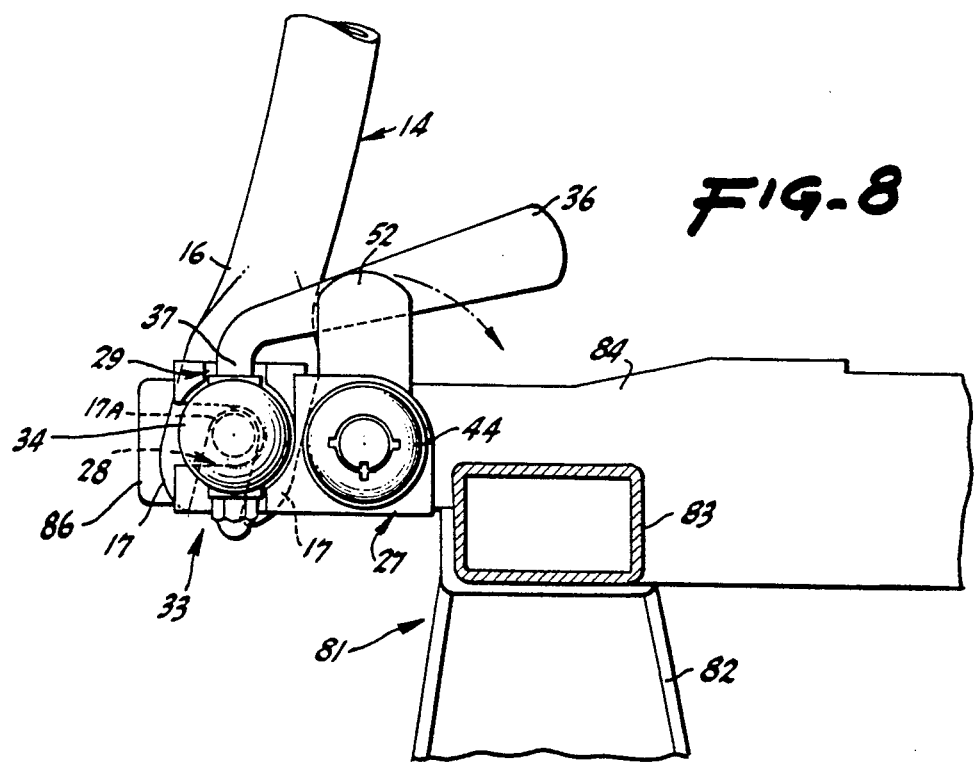

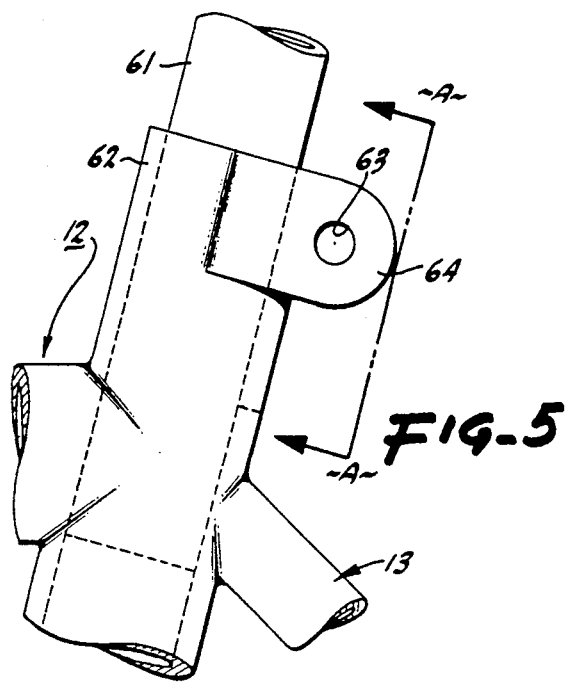
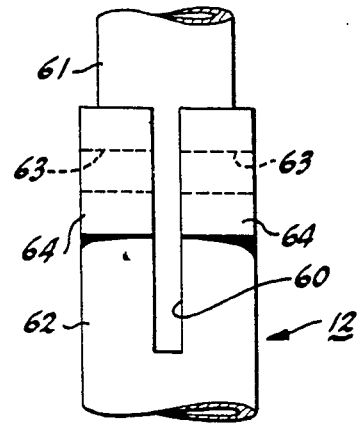
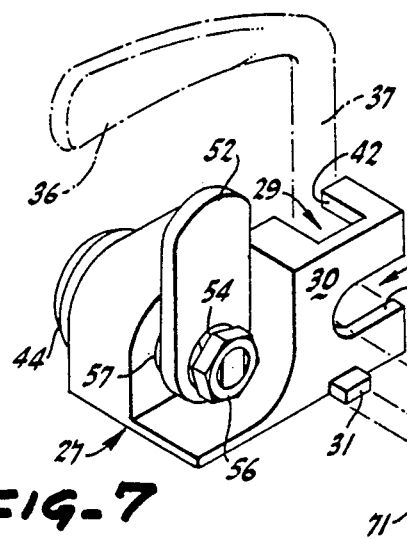
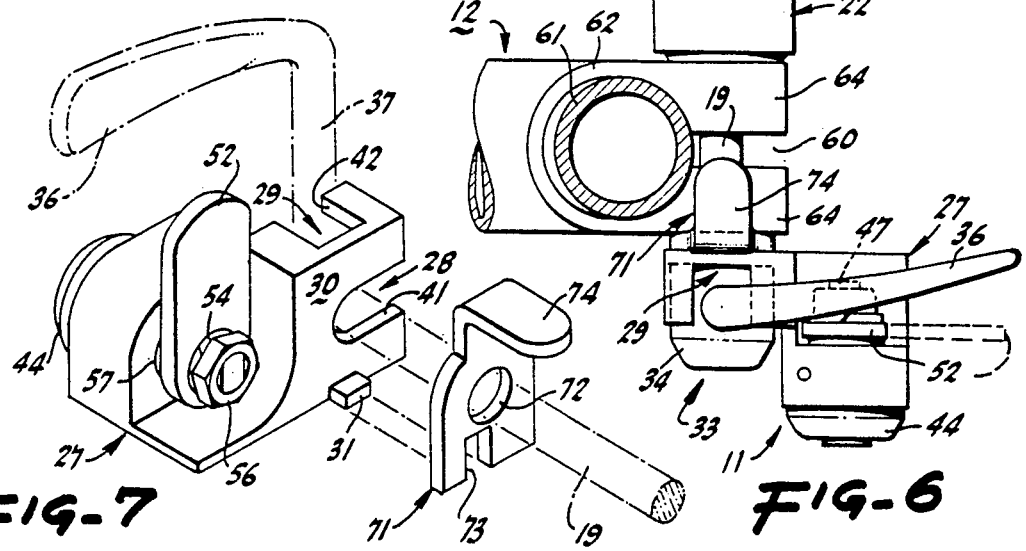

LOCK FOR QUICK RELEASE MECHANISM ON BICYCLE WHEELS, SEATS AND CAR RACKS

BACKGROUND OF THE INVENTION

1. Field of the Invention This invention relates generally to locks for use with quick release mechanisms on bicycle wheels, seats and car racks and, more particularly to locks for quick release mechanisms of the type having a hand-operated lever.

2. Description of the Related Art

A customary preliminary search yielded the following U.S. Pat. Nos.:

1,099,246 Green
2,140,489 Wise
4,114,409 Scire
4,621,873 Weinstein et al.
4,724,692 Turin et al.
4,770,011 Constant The Green and Wise patents are of historical interest only since they do not relate to quick release mechanisms.

The remaining four patents disclose locks for use with quick release mechanisms having a rotatable lever; but, their construction and manner of operation are at marked variance from the lock shown and described in the present application.

Quick release mechanisms of the lever type are widely used on bicycles, especially on the front wheel since they allow the wheel to be disconnected from the fork quickly and without tools. It is merely necessary to rotate the lever from a first, or closed, position to a second, or open, position. A 90 degree rotation of the lever is customarily enough to release the wheel from the fork.

While quick release mechanisms enable the owner of the bicycle to disconnect the wheel readily and easily in order to repair or replace a tire, or to chain the disconnected wheel and frame to a stationary object in the interests of security, such mechanisms also respond, unfortunately, to unscrupulous individuals who take advantage of the opportunity to steal the wheel or other part of the bicycle, such as a seat, similarly equipped with a quick release mechanism of the lever type.

It is therefore an object of the present invention to provide a lock which effectively immobilizes the lever of a quick release mechanism of the lever type, thereby foiling the efforts of unauthorized persons attempting to open the quick release mechanism.

It is another object of the invention to provide a lock of simple and economical, yet reliable, construction.

It is still another object of the invention to provide a lock which requires no modification to existing bicycle wheel equipment except the replacement of the existing clamping nut with a torque limiting nut.

It is yet another object of the invention to provide a lock which can be used on virtually all makes of bicycles using a quick release mechanism of the lever type.

A further object of the invention is to provide a lock that is fastened to the bicycle by the same clamping action as that of the existing quick release mechanism.

Still a further object of the invention is to provide a lock which requires no tools in order to be installed on the bicycle.

A yet further object of the invention is to provide a two position security device that indicates by inspection whether or not it is in effective position.

An additional object of the invention is to provide a lock that is small and relatively inconspicuous yet is readily available for key operation in all bicycle positions.

Another object of the invention is to provide a lock which can be used to immobilize the lever on the height adjustment clamping mechanism of a bicycle seat.

It is yet a further object of the invention to provide a lock which can also be used to immobilize the quick release lever on car racks utilizing a quick release mechanism to secure the bicycle fork to the car rack.

SUMMARY OF THE INVENTION

For use with a bicycle having a front fork apertured or slotted at the lower ends of the tines of the fork and having a hollow axle spanning the space between and engaging the tines and with a wheel hub rotatably mounted on the axle, the hollow axle being threaded on the ends and including a drawbar shaft extending therethrough with a conventional quick release mechanism mounted on one end and a torque limiting nut on the other end, there is provided a blade rotatably movable around a transverse axis by a detachable key between one position overlying and foreclosing movement of the adjacent end of the quick release lever in closed condition and another position spaced from and rendering accessible the end of the quick release lever for rotation of the lever to open condition and thereby releasing the wheel. When remounting the wheel the foregoing procedure is reversed and the key-operated blade is returned to lever-immobilizing position.

The same type of security is afforded to quick release mechanisms fitted to bicycle seat posts and bicycle carrying racks mounted on the top of a car.

BRIEF DESCRIPTION OF THE DRAWINGS

FIG. 3 is a fork-end detail in side elevation as indicated by the line 3—3 in FIG. 2;

FIG. 4 is an isometric perspective view of various parts of the device in exploded position;

FIG. 5 is a side elevation, with portions broken away, of a typical conventional bicycle frame and seat post construction prior to installation of the security device;

FIG. 5A is a fragmentary rear elevation of the seat post with slotted seat post socket and twin clamping ears taken on the line A—A in FIG. 5;

FIG. 6 is a top plan view, partially in section, of the seat post construction shown in FIG. 5, but with the security device installed;

FIG. 7 is an exploded isometric perspective view of the lock device similar to FIG. 4 but with a special L-shaped washer for the seat post installation; and, FIG. 8 is a cross-section on a vertical, longitudinal plane through a frame carried by the roof of a vehicle, the frame being adapted to receive the fork of a bicycle and showing the lock device of the invention in locked position in which the key-operated blade inhibits movement of the quick release lever.

DESCRIPTION OF THE PREFERRED EMBODIMENT

Figure 1:
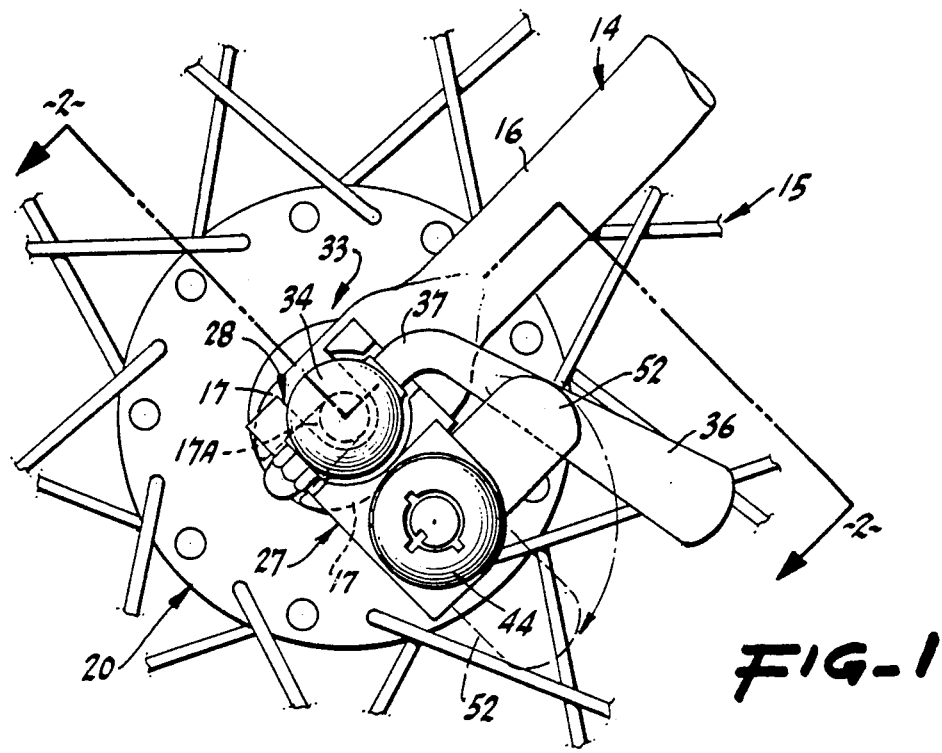
FIG. 1 is a side elevation, with portions broken away, of a bicycle front fork end and a related hub with a version of the security device installed and shown with the quick release lever and rotatable blade in closed position.

In accordance with one version of the invention, generally designated by the reference numeral 11, there is provided a bicycle frame 12 (see FIG. 5) including the usual rear fork tube 13 and front fork 14 (see FIG. 1), each fork including a pair of transversely spaced apart tines 16 each being bifurcated or slotted at their lower ends to leave on each tine a pair of tangs 17. The front fork 14 carries the front wheel 15, and, in the present disclosure will be the only fork shown and described in connection with the lock device 11.

Extending between the lower ends of the tines 16 of the front fork and lying in the spaces 18 between the respective pairs of tangs 17 is a hollow axle 17A threaded on both ends. Extending axially through the hollow axle 17A is a drawbar shaft 19 threaded for a short distance on one end.

The wheel hub 20 is rotatably mounted on the hollow axle 17A through anti-friction bearings confined in cages at opposite ends of the hub 20. In the usual case, the bearing cage is defined by an inner race on the hub 20 and an outer race defined by a bearing adjustment cone 25.

A bearing cone lock nut 21, threadably mounted on one end of the hollow axle 17A, confines the adjacent bearing adjustment cone 25 and a bearing cone lock nut 26, threadably mounted on the opposite end of the hollow axle 17A performs a like function with the adjacent bearing adjustment cone 25. By suitable manipulation of the lock nuts 21 and 26, the wheel hub 20 is appropriately positioned and adjusted relative to the wheel axle 17A, in well-known manner.

The lock nut 21 abuts the inner surface of the pair of tangs 17 located adjacent the threaded end of the drawbar shaft 19 (see FIG. 2); and on the other side of the same pair of tangs 17 is a special clamping nut 22 threadably mounted on the drawbar shaft 19. The special clamping nut 22 cannot be removed once the lock device is closed, as will now be explained in detail.

The outer end of the special clamping nut 22 is flared radially to afford a flange 23 serving somewhat loosely to confine and incorporate as part of the nut 22 a torque limiting ring 24. By inserting the drawbar shaft 19 through the hollow axle 17A into the location shown in FIG. 2, but with the quick release lever 36 in open position (shown in broken line in FIG. 2), and turning the nut 22 by hand until it bears against the adjacent pair of tangs 17, followed by rotating the quick release lever 36 toward closed position, a specially formed lock housing 27 will be forced against the adjacent pair of tangs 17. When the quick release lever is in fully closed position, the inner planar base 30 of the lock housing 27 will have clamped the adjacent tangs 17 against the lock nut 26; and, concurrently, the special nut 22 will have been "drawn in" and clamped the opposite pair of tangs 17 against the lock nut 21.

Then, by immobilizing the quick release lever 36, as will soon be explained, any subsequent attempt to back off the nut 22 will be foiled since the ring 24 will rotate on the axis of the nut 22 without a corresponding rotation of the nut 22 itself. The press, or interference fit, of the ring 24 on the nut 22 is chosen so that any torque in excess of a predetermined amount applied to the ring 24 will be ineffective to unscrew the nut 22 once the nut has been clamped in position.

On the opposite end of the drawbar shaft 19, there is a somewhat more elaborate structure. As previously described, next to the inside surface of the adjacent pair of tangs 17 there is a bearing cone lock nut 26; and, on the outside surface thereof is the base 30 of a specially formed lock housing 27 (see FIG. 4). On one end of the housing 27 is a longitudinally directed fork 28, from one tine of which extends a transverse fork 29. To prevent rotation of the housing 27, the other tine of the longitudinal fork 28 is augmented with a lug 31 that, when the lock device 11 is installed, extends between the adjacent bicycle fork end tangs 17, as appears most clearly in FIG. 3, and so prevents the housing 27 from rotating relative thereto.

The portion of the lock housing 27 immediately surrounding the adjacent end of the drawbar shaft 19 carries a conventional quick release mechanism, generally designated by the reference numeral 33. The usual quick release mechanism 33 includes a cam clamping housing 34 and, as previously mentioned, a cam actuating lever 36. In well-known manner, the lever 36 connects to a lever shaft 37 fitted with an eccentrically disposed cam (not shown) within the housing 34. The internal cam rotatably engages an eccentrically disposed bore in a cylindrical block on the adjacent end of the drawbar shaft 19.

Figure 2:
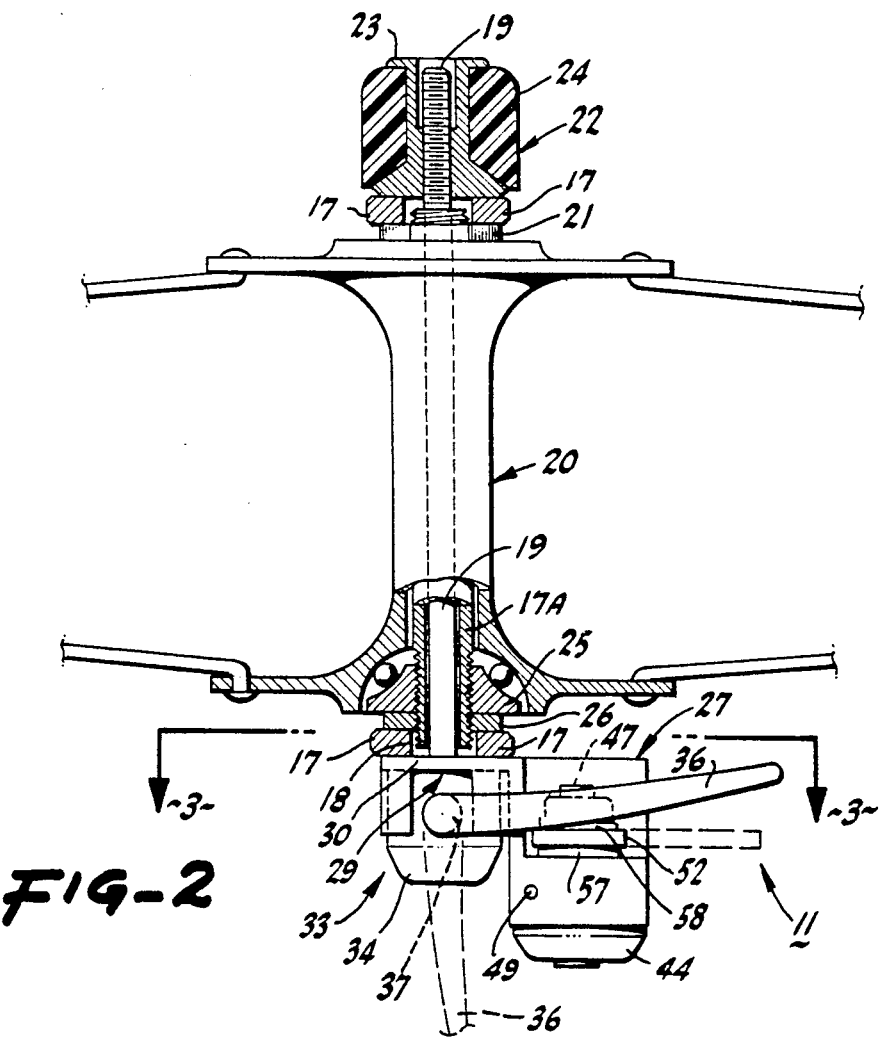
FIG. 2 is a cross-section, the compound plane of which is indicated by the lines 2—2 in FIG. 1.

In open position, the lever 36 is oriented in a direction parallel to the axis of the drawbar shaft, as shown in broken line in FIG. 2, as heretofore noted. With the lever 36 in this open orientation, the cam, the walls of the bore surrounding the cam, the cylindrical block and the drawbar shaft 19 are in maximum open position, i.e. the drawbar shaft 19 has been translated axially so that the clamping nut 22 on the distal end of the drawbar shaft 19 is separated from the adjacent one of the tangs 17 and allows unscrewing of the clamping nut 22 away from the adjacent tangs 17 so that the wheel can be removed, in well known manner.

With the cam actuating lever 36 in the closed position, shown in full line in FIG. 2, however, the eccentric cam, encompassing bore walls, block and drawbar shaft 19 are in maximum closed position, the drawbar shaft 19 having been shifted by the lever 36 so as to retract, or "draw in" the clamping nut 22, thereby clamping the two pairs of tangs 17 of the fork tightly between the clamping nut 22 at on end and the planar base 30 of the longitudinal fork 28 of the lock housing 27 at the other end. At the same time, the clamping nut 22 becomes a torque limiting device owing to the presence of the ring 24, as mentioned above.

As best appears in FIG. 2, the conventional quick release mechanism 33 is comfortably accommodated in the space afforded by the combined longitudinal fork 28 and the transverse fork 29 of the lock housing 27. The longitudinal fork 28 includes a central slot 41 (see FIG. 4) which permits the fork 28 to accommodate the drawbar shaft 19; and the transverse fork 29 includes a slot 42 which accommodates the lever shaft 37. All existing equipment on the bicycle remains undisturbed; and no tools are required to install the lock housing 27 and the attendant quick release mechanism 33 in operative condition.

In other words, the lock housing 27 can readily be fitted or retrofitted, in combination with a conventional quick release mechanism 33, onto existing bicycle equipment, namely the bicycle wheel and fork, without any need for additional fittings and without requiring any special tools, such as drills and taps.

The lock housing 27 is also especially designed to receive any one of a number of commercially available locks, such as a lock 44 operated by a hollow shank key 46 (see FIG. 4). After the lock 44 is inserted in the interior chamber of the lock housing 27, with the threaded stem 47 of the lock protruding through the rear wall 48 of the lock housing 27, the lock is staked securely in position by any suitable expedient such as a pin 49 driven through an opening 50 in the top of the lock housing 27 and into a registering bore (not shown) in the lock, the top of the pin 49 being either flush or countersunk at the conclusion of the lock installation to prevent easy removal of the lock 44 from the lock housing 27.

The threaded stem 47 has a pair of parallel flats 51 so that when a blade 52 having a conjugate aperture 53 is fitted on the stem 47 and secured by a lock washer 54 and non-reversible nut 56, the blade 52 is made rotatable in response to key action. As an alternative to the non-reversible nut, any other suitable expedient can be utilized, such as peening over, or riveting, the end of the stem 47 protruding beyond the aperture 53.

The blade 52 is positioned axially on the stem by a washer 57 so as to provide a small amount of clearance 58 (see FIG. 2) between the inside of the upper portion of the blade 52 and the adjacent face of the quick release lever 36 when the blade is in lever interfering relation, as shown most clearly in FIG. 1, in full line.

In closed position of the blade 52, established by appropriate rotation of the key 46 when engaged with the lock 44, the quick release lever 36 is effectively disabled, or immobilized, and, as a consequence, the quick release mechanism 33 is foreclosed from releasing the bicycle wheel. Possession of the key, in other words, becomes a requisite of activating and opening the quick release mechanism; and theft of the wheel is obviated, or at least deterred.

Many bicycle riders find it useful to be able to change the height of the bicycle seat under different conditions of operation or, in some instances, to remove the seat and attendant seat post 61 from the seat post socket 62, or tube, in the interests of security when the bicycle is left unattended.

FIGS. 5 and 5A illustrate a structure commonly used on bicycles to adjust the height of a bicycle seat (not shown) on the upper end of the seat post 61 disposed in the seat post socket 62. A bolt and nut (not shown) extending through registering openings 63 in two wings 64, or ears, welded on opposite sides of a slot 66 in the seat post socket 62 can be tightened and thereby clamp the seat post 61. A wrench is usually required, however, to loosen or tighten the nut on the bolt in the event it is desired to adjust the seat or remove the seat and the seat post.

This procedure may be simplified by the use of a conventional quick release mechanism 33 instead of the usual nut and bolt which require a wrench in order to adjust the seat height or remove the seat. However, as explained previously, quick release mechanisms can, unless controlled, be utilized to the bike owner's disadvantage by unscrupulous individuals.

We have therefore adapted our quick release lever lock device 11 to afford protection to users of quick release mechanisms in connection with bicycle seats (see FIGS. 5, 5A, 6 and 7).

The quick release lever lock device 11 of the present invention is installed in the same fashion as on bicycle wheels, the only significant difference being the addition of an L-shaped washer 71 (see FIGS. 6 and 7) which is used to prevent lock rotation. With the quick release mechanism 33 and lock device 11 installed so that the draw bar shaft 19 extends through the openings 63 in the ears 64, as in FIG. 6, rotation of the lever 36, forcefully urges toward each other the two wings 64, or ears, on opposite sides of the vertical slot 60 in the seat post socket 62; and, as explained above, clamping the two wings 64 toward each other tends to close the underlying seat post tube 62, thereby tightly securing the seat post 61 encompassed by the tube 62.

The anti-rotation lug 31 inserted between one pair of the tangs 17 in the wheel-mounted version of the device, as previously described, is also utilized in the seat-mounted lock device. As appears most clearly in FIG. 7, the special L-shaped washer 71 includes a central circular opening 72 to accommodate the drawbar shaft 19 and a bottom aperture 73 to receive the anti-rotation lug 31.

The L-shaped washer 71 is itself anchored against rotation by the provision of a prong 74 mounted on the top of the washer and projecting inwardly over the top of the adjacent wing 64 at right angles thereto and being long enough substantially to abut the adjacent wall portion of the seat post socket 62 (see FIG. 6) when the quick release mechanism 33 and the quick release lever lock device of the present invention is in installed position.

As before, the quick release lever 36 is immobilized in closed position owing to the interfering relation of the blade 52 in upright position, as appears in FIG. 6. By appropriate rotation of the key 46, however, the blade 52 is moved to the open position, shown in broken line in FIG. 6, allowing the lever 36 to be rotated, loosening the drawbar shaft 19 and allowing the two wings 64 to release their clamping effort on the seat post tube 62 so as to permit removal or translation of the seat post 61 and attendant seat (not shown).

FIG. 8 illustrates the use of the present invention on still another application of a quick release mechanism 33, namely, on a conventional car rack 81 comprising the usual footing 82, or framework, supported on the roof of a vehicle. A transverse cross-beam 83 mounted on the footing 82 supports the forward end of a longitudinal channel 84; and, as before, the tines 16 of the front fork 14 terminate in an opposed pair of tangs 17 which are clamped to a pair of fore and aft plates 86 extending forwardly from the channel 84. Clamping is effected by the quick release mechanism 33 and as previously described, the quick release lever 36 in closed position is immobilized by the key-lock actuated blade 52.

We claim:

1. For use with a bicycle having a frame, a front fork, a front wheel with a hub rotatably mounted on a hollow axle spanning the space between and engaging the front fork, a cam actuated quick release mechanism including a drawbar shaft extending through the axle, a lever shaft and a cam actuating lever connected to the drawbar shaft for selectively securing and releasing the front wheel relative to the front fork, a lock device comprising:

a. a torque limiting nut mounted on one end of the drawbar shaft;
   b. a lock housing positioned on the other end of the drawbar shaft;
   c. a lock mounted on said housing and including a blade movable between a first position in non-interfering relation with the cam actuating lever and a second position in interfering relation therewith; and, d. lock engaging means for selectively moving said blade between said first position and said second position with the cam actuating lever in front wheel securing relation.

2. a lock device as in claim 1 in which said lock engaging means is a key.

3. A lock device as in claim 1 in which said torque limiting nut includes an inner portion threaded for engagement with one end of the drawbar shaft and an outer portion mounted on said inner portion with an interference fit selected so that any torque applied to said outer portion in excess of a predetermined amount is ineffective to rotate said inner portion.

4. A lock device as in claim 1 in which said lock housing includes a longitudinally directed fork having first and second parallel tines, a transverse fork mounted on said first of said tines and directed in a first direction at right angles relative to said first of said tines, and a lug mounted on said second of said tines and directed in a second direction at right angles to said second of said tines and opposite to said first direction said longitudinal fork embracing the drawbar shaft, said transverse fork embracing the quick release lever, and said lug being embraced by one of the front fork tines in installed position of said lock housing.

5. A lock device as in claim 4, further including a lock chamber; and means for anchoring said lock in said lock chamber.

6. Lock device for bicycle quick release mechanism having a cam actuated drawbar shaft and a cam actuating lever and lever shaft operatively connected to the drawbar shaft for movement of the drawbar shaft between an extended and a contracted position as the cam actuating lever is moved respectively between an unlocked position in which the cam actuating lever is substantially parallel to the drawbar shaft and a locked position in which the cam actuating lever is substantially perpendicular to the drawbar shaft, said lock device comprising:

a. a torque limiting nut mounted on one end of the drawbar shaft;

b. a lock housing mounted on the other end of the drawbar shaft;

c. a lock mounted on said housing and including a blade movable between a first position in non-interfering relation with cam actuating lever and a second position in interfering relation therewith; and, d. lock engaging means for selectively moving said blade between said first position and said second position with the cam actuating lever in said locked position.

* * * * *